US009288558B2

(12) United States Patent
Dana et al.

(10) Patent No.: US 9,288,558 B2
(45) Date of Patent: Mar. 15, 2016

(54) SYSTEM FOR TRANSLATING INSTRUCTIONS IN A SWITCH NODE

(71) Applicant: Infinera Corp., Annapolis Junction, MD (US)

(72) Inventors: Soven Kumar Dana, Bangalore (IN); Chander Prakash Singh Dogra, Bangalore (IN); Sandeep Kumar, Bangalore (IN); Eric Heistermann, Santa Clara, CA (US)

(73) Assignee: Infinera Corporation, Sunnyvale, CA (US)

( * ) Notice: Subject to any disclaimer, the term of this patent is extended or adjusted under 35 U.S.C. 154(b) by 162 days.

(21) Appl. No.: 14/229,436

(22) Filed: Mar. 28, 2014

(65) Prior Publication Data

US 2015/0281812 A1 Oct. 1, 2015

(51) Int. Cl.
*H04J 14/00* (2006.01)
*H04Q 11/00* (2006.01)

(52) U.S. Cl.
CPC ........ *H04Q 11/0003* (2013.01); *H04Q 11/0005* (2013.01); *H04Q 2011/0037* (2013.01)

(58) Field of Classification Search
CPC .......... H04Q 11/0003; H04Q 11/0005; H04Q 2011/0037; H04Q 2011/0039; H04Q 2011/0041; H04Q 2011/0058; H04Q 2011/006; H04Q 11/0062; H04Q 2011/0079; H04Q 2011/0088

USPC ............... 398/45, 48, 50, 51, 54, 56
See application file for complete search history.

(56) References Cited

U.S. PATENT DOCUMENTS

| | | | | |
|---|---|---|---|---|
| 6,600,581 | B1 * | 7/2003 | Fatehi ................. | H04Q 11/0005 398/9 |
| 6,757,282 | B1 * | 6/2004 | Ofek ................... | H04Q 11/0005 370/389 |
| 7,813,640 | B2 * | 10/2010 | Amemiya .......... | H04Q 11/0005 398/45 |
| 9,167,319 | B2 * | 10/2015 | Mori ................... | H04Q 11/0005 |
| 2015/0030327 | A1 * | 1/2015 | Kataoka ............. | G02B 26/0816 398/48 |

* cited by examiner

*Primary Examiner* — Mohammad R Sedighian
(74) *Attorney, Agent, or Firm* — Dunlap Codding P.C.; David L. Soltz

(57) ABSTRACT

A control module for an optical switch node, comprising a TIM having a plurality of operating modes in which a first mode is identified by a first byte sequence; a communication interface unit transmitting a second byte sequence for placing the TIM in the first mode, the first byte sequence different from the second byte sequence, and a gate array receiving the second byte sequence, storing a list of predetermined unique values, each value indicative of a particular operating mode command, receiving at least a portion of the second byte sequence and receiving instructions to apply an algorithm to at least a portion of the second byte sequence to transform the portion into a checksum value, comparing the checksum value to the list to determine the operating mode command, and transmitting the first byte sequence to the TIM to place the TIM into the first mode.

20 Claims, 4 Drawing Sheets

SYSTEM FOR TRANSLATING INSTRUCTIONS IN A SWITCH NODE

FIELD OF THE DISCLOSURE

The disclosure generally relates to methods and apparatuses for enabling software having a first command set to communicate with and control hardware components that operate under a second command set that is different from the first command set in an optical switch node. More particularly the disclosure relates to methodologies for translating operating mode commands for tributary interface modules from communication interface units in optical switch nodes. Though the methodologies set forth herein are in the context of optical switch nodes in optical transport networks, such methodologies may be applied to other systems requiring software-transparent communication between components.

BACKGROUND

A switched network usually includes multiple switch nodes (also referred to as "nodes") which are connected by communication links and arranged in a topology referred to in the art as a "mesh network". Within the mesh network, user traffic can be transported between any two locations using predefined connections specifying particular links and/or switch nodes for conveying the user traffic.

The switch nodes in the mesh network are each provided with a control module. The control modules of the switch nodes function together to aid in the control and management of the mesh networks. The control modules can run a variety of protocols for conducting the control and management of the mesh networks. One prominent protocol is referred to in the art as "Generalized Multiprotocol Label Switching (GM-PLS)".

Lowering the cost of a node often involves re-designing the hardware of the control module using low cost electronic components but keeping the system software unchanged. However, the programming requirement and the command set in the new, cost-reduced hardware may be different from the previous hardware for which the software has been originally developed. Replacing a component of the control module typically requires that either the new component or other components in the control module be reprogrammed to use the same system software.

Alternatively, some systems have translated commands from the software into a corresponding command for the new hardware. A general method to identify the received byte-sequence will be described hereinafter. In the general method, there are M numbers of stored sequences and each sequence is N-byte long. The byte $[a_{ij}]$ is the j-th byte of sequence number i. The byte-sequence for a particular mode is unique and predetermined. The known byte-sequences for all the modes are stored in the hardware. The received byte-sequence is, say, $[ax0, ax1, \ldots, ax(N-1)]$ where $x \in \{0, (M-1)\}$. Identification of the byte-sequence is achieved by determining the value of x in the FPGA. At first, the received byte-sequence is saved in the RNV memory in the FPGA. Then, the received sequence of bytes is compared with the M numbers of stored sequences by comparing all the bytes of the sequence to declare a match. Thus the received sequence, x, is determined. This technique requires N-byte R/W memory cells in the FPGA to save all the received bytes, ax0, ax1, ..., ax(N-1). It also requires comparison of the entire sequence with all the stored sequences to determine a match. M numbers of digital comparators are required, each comparator being N-byte long. So this technique is resource intensive and inefficient and may not be suitable for implementation in FPGA with limited resources such as the memory and logic blocks.

Apparatuses and methods are needed to enable hardware components having a command set that differs from the command set utilized by the software to be used to update and/or make new control modules without having to update and/or reprogram the command set of the system software while reducing resource usage and cost. It is to such a system and method that the present disclosure is directed.

SUMMARY

Apparatuses and methods are disclosed to address the problem of control module components having a first command set that differs from a second command set of system software running on the control module, or other control modules communicating with the control module. In one aspect, the disclosure describes a method for identifying a byte sequence using a hash function implemented in a low-cost field programmable gate array without using a read/write memory cell for a software-transparent, cost reduced hardware design. In one aspect, the present disclosure describes, but is not limited to, a control module having a translator apparatus to receive a byte-sequence embedded within a software command indicative of a particular operating mode, applying an algorithm to at least a portion of the byte-sequence to transform the portion of the second byte sequence into a checksum value, determining the operating mode from the checksum value and configuring hardware within a tributary interface module of a control module within a switch node for that particular operating mode.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

Figure 1:
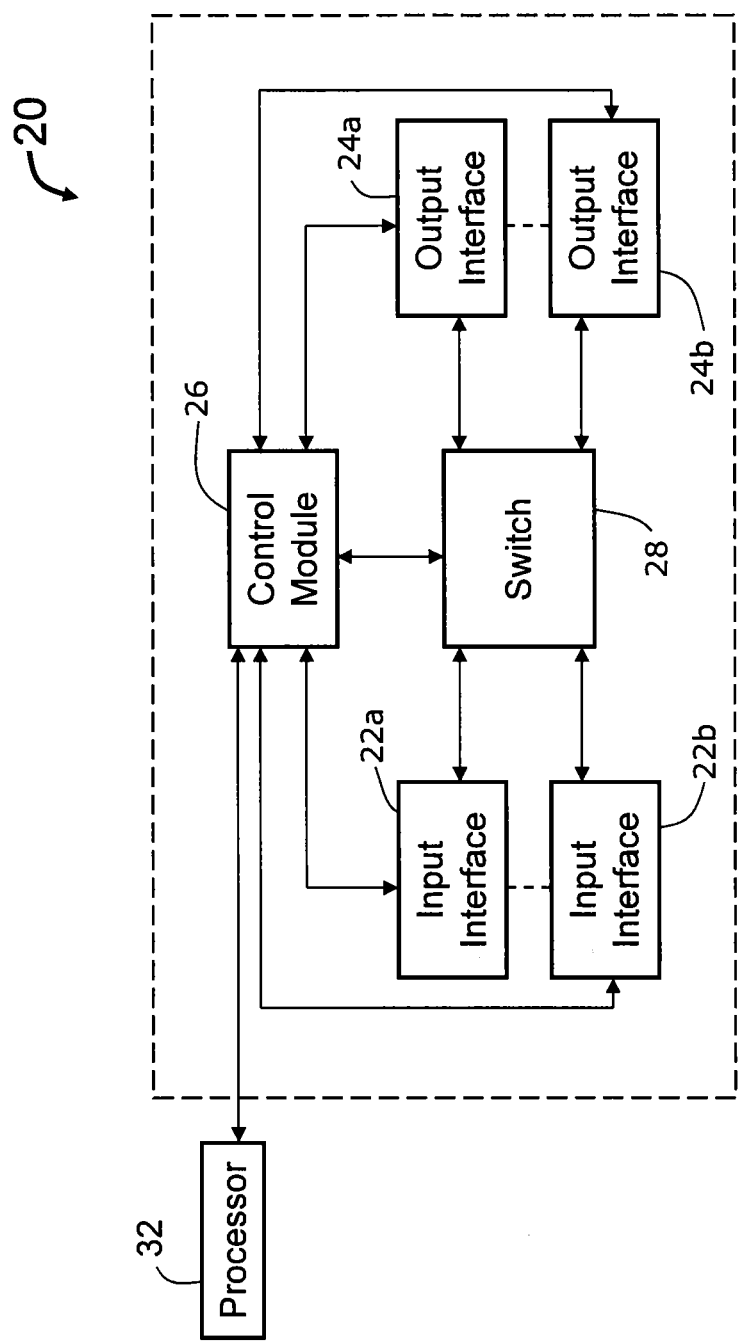
FIG. 1 is a schematic block diagram of an exemplary node constructed in accordance with the present disclosure.

The following detailed description refers to the accompanying drawings. The same reference numbers in different drawings may identify the same or similar elements.

The mechanisms proposed in this disclosure circumvent the problems described above. The present disclosure describes methods and systems for translating operating mode commands between components in a control module.

Consistent with an aspect of the present disclosure, a control module, for an optical switch node, may comprise a tributary interface module (TIM) having a plurality of operating modes in which a first mode of the plurality of operating modes is identified by a first byte sequence; a communication interface unit transmitting at least one first signal containing a second byte sequence indicative of at least one operating mode command for placing the tributary interface module into the first mode, the first byte sequence different from the second byte sequence; and a translator apparatus comprising an input port receiving the second byte sequence from the communication interface unit; a first register storing a list of predetermined unique values, each value indicative of a particular operating mode command; a second register receiving at least a predetermined portion of the second byte sequence and receiving instructions to apply an algorithm to at least a portion of the second byte sequence to transform the portion of the second byte sequence into a checksum value; at least one comparator comparing the checksum value to the list of predetermined unique values to determine the operating mode command contained in the byte sequence; and an output port transmitting at least one second signal containing the first byte sequence to the tributary interface module to place the tributary interface module into the first mode.

Consistent with an aspect of the present disclosure, the first byte sequence may have a first number of bits and the second byte sequence may have a second number of bits that is different from the first number of bits of the first byte sequence.

Consistent with an aspect of the present disclosure, the comparator may be a three-byte comparator. In another aspect, the comparator may be a single-byte comparator.

Consistent with an aspect of the present disclosure, the predetermined portion of the second byte sequence may be between two and five bytes of the second byte sequence.

Consistent with an aspect of the present disclosure, the checksum value may be a single byte.

Consistent with an aspect of the present disclosure, the translator apparatus may include a field programmable gate array.

DEFINITIONS

If used throughout the description and the drawings, the following short terms have the following meanings unless otherwise stated:

GMPLS stands for Generalized Multi-Protocol Label Switching which extends Multi-Protocol Label Switching to encompass time-division (for example, SONET/SDH, PDH, G.709), wavelength (lambdas), and spatial multiplexing (e.g., incoming port or fiber to outgoing port or fiber). The GMPLS framework includes a set of routing protocols which runs on a control module. The Generalized Multiprotocol Label Switching architecture is defined, for example in RFC 3945.

IETF stands for Internet Engineering Task Force. The Internet Engineering Task Force (IETF) is a volunteer group dedicated to improving the Internet by proposing uniform standards for data transfer protocols, among other things. The IETF has recently extended GMPLS to allow for the transmission of more data through an Optical Transport Network (OTN). The IETF publishes Requests for Comment (RFC) detailing proposed standard protocols.

MPLS stands for multi-protocol label switching which is a scheme in telecommunications networks for carrying data from one node to the next node. MPLS operates at an OSI model layer that is generally considered to lie between traditional definitions of layer 2 (data link layer) and layer 3 (network layer) and is thus often referred to as a layer 2.5 protocol.

OTN stands for Optical Transport Network which includes a set of optical switch nodes which are connected by optical fiber links. ITU-T recommendations G.709 and G.872 define OTN interface requirements and network architecture respectively.

TE stands for Traffic Engineering which is a technology that is concerned with performance optimization of operational networks. In general, TE includes a set of applications mechanisms, tools, and scientific principles that allow for measuring, modeling, characterizing and control of user data traffic in order to achieve specific performance objectives.

DESCRIPTION

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more and the singular also includes the plural unless it is obvious that it is meant otherwise.

Further, use of the term "plurality" is meant to convey "more than one" unless expressly stated to the contrary.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Figure 2:
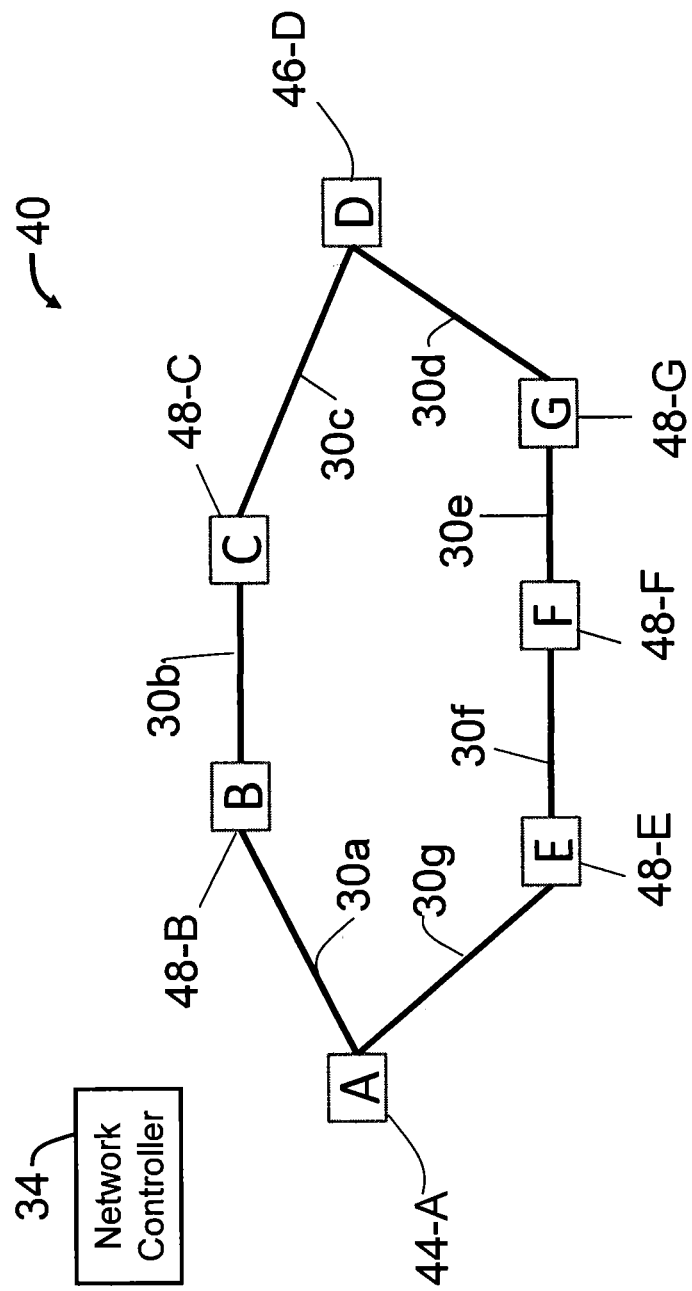
FIG. 2 is a schematic block diagram of an exemplary mesh network.

Referring now to the drawings, and in particular to FIG. 1, shown therein and designated by reference numeral 20 is a block diagram of an exemplary node constructed in accordance with the present disclosure. The node 20 is adapted to facilitate the communication of data (which may be referred to herein as "traffic" and/or "data traffic") between multiple nodes 20 in a mesh network 40, as shown in FIG. 2. Different types of traffic may be transmitted in the mesh network 40. The mesh network 40 may be, for example, an optical transport network (OTN).

The node 20 is provided with one or more input interfaces 22, such as input interfaces 22a, 22b, one or more output interfaces 24, such as output interface 24a, 24b, a control module 26, and a switch 28. In general, the input interfaces 22a and 22b are adapted to receive traffic from the shared mesh network 40, and the output interfaces 24a and 24b are adapted to transmit traffic onto the shared mesh network 40 (see FIG. 2). The switch 28 serves to communicate the traffic from the input interfaces 22a and 22b, to the output interfaces 24a and 24b. And, the control module 26 serves to control the operations of the input interfaces 22a and 22b, the output interfaces 24a and 24b, and the switch 28, as well as to set up label switched paths within the shared mesh network 40. The node 20 may also include non-transitory memory (not shown), either within the control module 26 and/or the switch 28, or separate from the control module 26 and/or the switch 28.

The node 20 can be implemented in a variety of ways, including, commercial installations having one or more backplanes (not shown), racks, and the like. In this example, the input interface(s) 22, the output interface(s) 24, the control module 26 and the switch 28 are typically implemented as separate devices, which may have their own power supply, local memory and processing equipment. In another example, the node 20 can be implemented as a single device having a shared power supply, memory and processing equipment. Or, in another example, the node 20 can be implemented in a modular manner in which one or more of the input interface(s) 22, the output interface(s) 24, the control module 26 and the switch 28 shares a power supply and/or housing.

The input interface(s) 22 and the output interface(s) 24 of one node 20 are adapted to communicate with corresponding input interface(s) 22, and output interface(s) 24 of another node 20 within the shared mesh network 40 via communication links 30, as shown in FIG. 2. An example of an input interface 22 and/or an output interface 24 is an Ethernet card or optical port. In general, each of the input interface(s) 22 and/or the output interface(s) 24 may have a unique logical identification, such as an IP address. The communication links 30 can be implemented in a variety of ways, such as a physical link including electrical (e.g., copper wire or coax) and/or optical signal (e.g., optical fiber or other waveguide) carrying capabilities, or as a wireless link. The communication links 30 can be fiber optic cables, electronics cables, wireless communication links, or the like.

The implementation of the input interface(s) 22, and the output interface(s) 24 will depend upon the particular type of communication link 30 that the particular input interface 22 and/or output interface 24 is designed to communicate with. For example, one of the input interfaces 22 can be designed to communicate wirelessly with another node 20 within the shared mesh network 40, while one of the output interfaces 24 of the node 20 can be designed to communicate optically through a fiber-optic link. For a particular node 20, the input interfaces 22a and 22b can be of the same type or different types; the output interfaces 24a and 24b can be of the same type or different types; and the input interface(s) 22 and output interface(s) 24 can be of the same type or different types.

In accordance with the present disclosure, messages transmitted between the nodes 20 can be processed by circuitry within the input interface(s) 22, and/or the output interface(s) 24 and/or the control module 26. Circuitry could be analog and/or digital components, or one or more suitably programmed microprocessors and associated hardware and software, or hardwired logic.

Also, certain portions of the implementations have been described as "components" that perform one or more functions. The term "component," may include hardware, such as a processor, an application specific integrated circuit (ASIC), or a field programmable gate array (FPGA), or a combination of hardware and software. Software includes one or more computer executable instructions that when executed by one or more component cause the component to perform a specified function. It should be understood that the algorithms described herein are stored on one or more non-transient memory. Exemplary non-transient memory includes random access memory, read only memory, flash memory or the like. Such non-transient memory can be electrically based or optically based. Further, the messages described herein may be generated by the components and result in various physical transformations.

The input interface 22 and the output interface 24 are shown separately for purposes of clarity. However, it should be understood that one or more of the input interfaces 22 and/or the output interfaces 24 could be connected to a single communication link 30 and implemented as a single device, such as a line module. Exemplary line modules and nodes are described in U.S. Pat. No. 8,223,803 (Application Publication number 20090245289), entitled "Programmable Time Division Multiplexed Switching," the entire contents of which are hereby incorporated herein by reference. Further, it should be understood that the node can be implemented in a variety of manners.

Consistent with one aspect of the present disclosure, one or more processor 32 may be used externally to the node 20. The processor 32 may be any suitable processor 32 and may be located externally to node 20 and/or shared mesh network 40. One example of a suitable processor 32 is a processor in a network management station/network administrator station 34 (as shown in FIG. 2). However, it should be understood that the processor 32 may be located anywhere. The processor 32 may execute system software having instructions that cause the processor 32 to perform the methods described herein. The information produced by the processor 32 may be stored in non-transitory memory (not shown). The processor 32 may provide the information to the node 20 through the control module 26.

A schematic diagram of an exemplary shared mesh network 40 is shown in FIG. 2, by way of example. In FIG. 2, the shared mesh network 40 includes nodes 20 labeled as A, B, C, D, E, F, and G Some of the nodes 20 are denoted as a headend node 44 (also known as a source node) or tailend node 46 (also known as a destination node) for a particular path in accordance to the path setup direction. Other nodes 20 are known as intermediate nodes 48. In this example, the shared mesh network 40 includes headend node 44-A; tailend node 46-D; and intermediate nodes 48-B, 48-C, 48-E, 48-F, and 48-G; connected by communication links 30a-30g. Of course, it will be understood that any number of nodes 20 and communication links 30 may be used.

Internal or external to the shared mesh network 40 may be one or more network administrator station 34 (also known as a network management station). The network administrator station 34 may have one or more processors 32 having one or more non-transitory memory (not shown). The network administrator station 34 may control aspects of the shared mesh network 40 and communicate with various network elements. The network administrator station 34 may also be referred to as a network controller.

Connections through the mesh network 40 may be configured using GMPLS protocols and/or the connections may be configured at individual nodes 20. The network administrator station 34 may configure the connections in the shared mesh network 40.

Consistent with one aspect of the present disclosure, circuitry of the node 20 and/or the network administrator station 34 may generate signals comprising messages to configure the individual nodes 20. For example, the headend node 44 may transmit signals through an output interface 24 of the headend node 44 to an input interface 22 of one or more other nodes 20, for example, to set up the connections in the mesh network 40. Circuitry of the headend node 44 may generate additional signals comprising additional messages and transmit the signals through the output interface 24 to input interfaces 22 of the nodes 20 in the connections. Messages may include instructions for configuring nodes 20, time slot information, multiplexing information, and the like.

Figure 3:
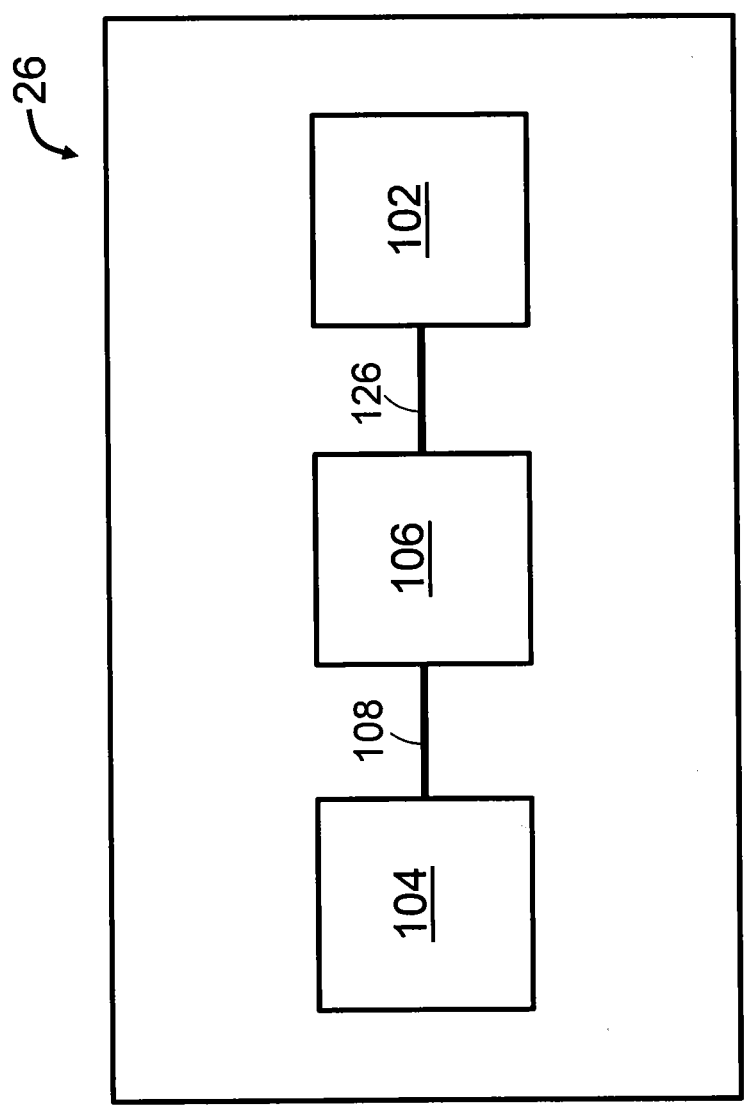
FIG. 3 is a schematic block diagram of an exemplary control module in accordance with the present disclosure.

FIG. 3 is a partial block diagram of an exemplary control module 26 of the node 20 in accordance with the present inventive concepts of the disclosure. The control module 26 may have components that include, in part, a tributary interface module (TIM) 102, a communication interface unit 104, and a translator apparatus 106.

As will be understood by one skilled in the art, the node 20 can be configured to be a part of multiple paths through the mesh network 40. Data carried along the paths may be transmitted through the node 20 at different times and/or simultaneously using different wavelengths of light. The paths may have different configurations and/or convey various types of data traffic, such as but not limited to telecommunication traffic, Ethernet traffic, SONET traffic, fiber channel traffic, etc. The control module 26 of the node 20 is configured to particular operating modes for each of the paths to assist in conveying the traffic from the headend node 44 to the tailend node 46. The different types of traffic may require different modes of traffic handling by the components within the node 20, such as the TIM 102 of the control module 26. The components of the control module 26, such as the TIM 102, may be programmed with different operating modes depending on which type of traffic will be transmitted for a particular path.

The structure and operation of suitable communication interface units 104 and tributary interface modules 102 are well known in the art, and as such will not be described in detail herein.

Typically, the TIM 102 has a plurality of operating modes. Each operating mode in the plurality of operating modes is identified by a particular TIM operating mode byte sequence, including a first mode identified by a first byte sequence. The byte sequence to configure the TIM for any particular mode is unique and predetermined. The 'byte-sequence' is also referred as a 'byte-stream' or a 'mode file' and can be programmed in the hardware.

To program the operating mode for the TIM 102, a first signal 108 is passed to the TIM 102. The first signal 108 is adapted to place the TIM 102 in the desired operating mode. The first signal 108 contains a second byte sequence containing at least one operating mode command for the desired operating mode. The second byte sequence may contain additional information with the operating mode information. The first signal 108 is typically transmitted from the communication interface unit 104 to the translator apparatus 106. The translator apparatus 106 identifies the operating mode information within the second byte sequence and then provides the first byte sequence to the TIM 102 to place the TIM 102 into the desired operating mode. In other words, the translator apparatus 106 translates the second byte sequence into the first byte sequence and provides the first byte sequence to the TIM 102 to place the TIM 102 into the desired operating mode.

Figure 4:
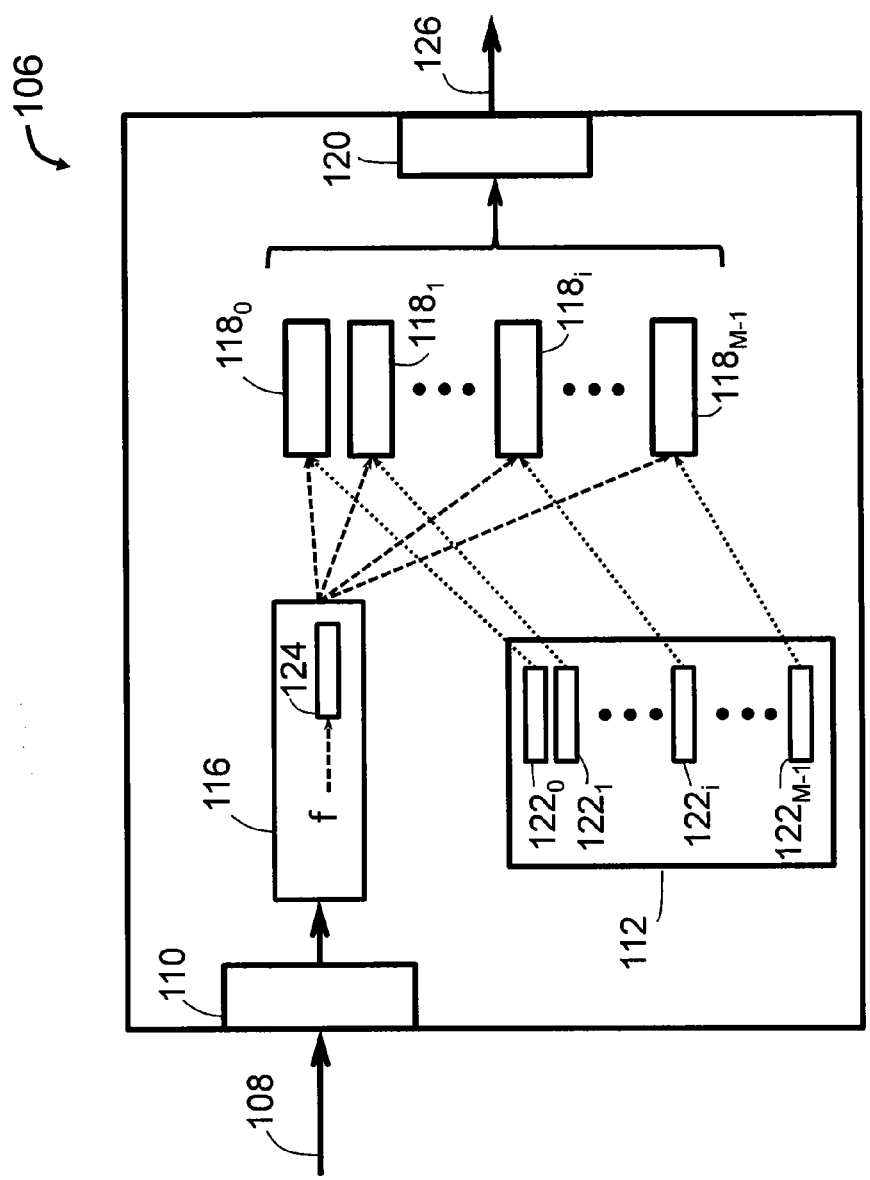
FIG. 4 is a schematic block diagram of an exemplary translator apparatus in accordance with the present disclosure.

FIG. 4 is a schematic block diagram of an exemplary translator apparatus 106. The translator apparatus 106 may include an input port 110, a first register 112, a second register 116, at least one comparator 118 (such as comparators $118_0 \ldots 118_{M-1}$), and an output port 120.

In general, consistent with one aspect of the present disclosure, the translator apparatus 106 receives with the input port 110 a first signal 108 from the communication interface unit 104 containing an operating mode byte sequence, computes and stores within the second register 116 a checksum value 124 from at least a portion of the byte sequence received from the communication interface unit 104, compares using one or more comparator 118 the checksum value 124 with unique values $122_0 \ldots 122_{M-1}$ indicative of operating modes stored in the first register 112 to find a match in the unique values $122_0 \ldots 122_{M-1}$ for the checksum value 124, and outputs a second signal 126 containing an operating mode byte sequence indexed to the matched unique values indicative of the TIM operating mode to the TIM 102 through the output port 120.

More particularly, the list of unique values $122_0 \ldots 122_{M-1}$ stored in the first register 112 may be predetermined and created by applying an algorithm (f) to each of the "M" number of possible byte sequences that may be transmitted in the first signal 108 by the communication interface unit 104. The possible byte sequences from the communication interface unit 104 and the operating mode command carried by each byte sequence are already known. The second register 116 may apply the algorithm to all of the possible byte sequences that may be sent by the communication interface unit 104 to determine the unique values $122_0 \ldots 122_{M-1}$.

Any algorithm may be used such that the output of the algorithm applied to the byte sequence is unique for each of the byte sequences. There may be various possible algorithms that may be chosen as the algorithm, or a suitable algorithm may be known, as long as application of the algorithm to the byte sequence results in the unique values $122_0 \ldots 122_{M-1}$ for the byte sequences. In one example, the byte patterns of the byte sequences may be analyzed to find such a suitable algorithm. In one example, the algorithm may be a hash function. The algorithm may be chosen using digital operations in the second register 116. Alternatively, the algorithm may be chosen elsewhere and provided.

In one aspect of the present disclosure, not all of the bytes of the byte sequence are used in the computation of the unique value 122. In one aspect of the present disclosure, only some of the bytes of the byte sequence are used to compute the unique value 122. In one aspect of the present disclosure, one byte, two bytes, three bytes, four bytes, or five bytes are used to compute the unique value 122. Of course, it will be appreciated that any number of bytes, and/or any specific bytes, may be used that result in unique values $122_0 \ldots 122_{M-1}$ for the byte sequences.

Moreover, the unique value 122 output by the algorithm can be one or more bytes in length. The shorter the unique value 122, the fewer logic resources are required for comparing the output and fewer hardware resources are required in the first register 112 to store the list of unique values $122_0 \ldots 122_{M-1}$ in the first register 112.

Additionally, the first register 112 may store a command set of operating mode byte sequences that upon receipt by the TIM 102 places the TIM 102 into a predetermined operating mode. Each operating mode byte sequence is indexed to a corresponding one of the unique values $122_0 \ldots 122_{M-1}$.

In use, the first signal 108 transmitted from the communication interface unit 104 contains the second byte sequence with at least one operating mode command for placing the TIM 102 in the first operating mode. As previously described, the first byte sequence supplied to the TIM 102 (operating mode byte sequence) is different from the second byte sequence received by the translator apparatus 106 such that the second byte sequence as transmitted by the communication interface unit 104 would not be recognized by the TIM 102 to place the TIM 102 into the first operating mode without translation to the first byte sequence.

The second register 116 receives at least a predetermined portion of the second byte sequence and receives instructions to apply the same algorithm (f) previously described to at least a portion of the second byte sequence to transform the second byte sequence, or at least the predetermined portion of the second byte sequence, into the checksum value 124. The second register 116 applies the algorithm (f) to the second byte sequence, or at least a portion of the second byte sequence, and computes the checksum value 124. The checksum value 124 is temporarily stored in the second register 116.

Then, the at least one comparator $118_0 \ldots 118_{M-1}$ compares the checksum value 124 from the second register 116 to the predetermined unique values $122_0 \ldots 122_{M-1}$ from the list stored in the first register 112 to determine the matching unique value 122 and the TIM operating mode byte sequence indexed to the unique value 122 to include in the second signal 126. The algorithm (f) to compute the checksum is applied on-the-fly on the bytes while the byte sequence is being received. The translator apparatus 106 does not need to store the sequence in Read/Write memory and therefore the translator apparatus 106 does not require a Read/Write memory cell to save the byte sequence.

The output port 120 then transmits at least one second signal 126 containing the first byte sequence having the operating mode command indicative of the first operating mode to the TIM 102 to place the TIM 102 into the first mode.

The control module 26 having the translator apparatus 106 may be implemented in a variety of manners. For explanatory purposes, the TIM 102 can be a TIM-5x10G-CR built by Infinera Corporation. The TIM-5x10G-CR processes up to 10G data from five clients and supports various data formats such as SONET, SDH, Ethernet, etc. The TIM-5x10G-CR recognizes sixteen pre-determined byte-sequences corresponding to sixteen operating modes. For explanatory purposes, the byte-sequences are numbered from 0 to 15 corresponding to the modes A to P and there are 24 bytes in each byte sequence.

Consistent with one aspect of the present disclosure, in a general implementation all the bytes of the byte sequences from the communication interface unit 104 may be utilized. In one example, when a particular chosen algorithm is applied, the unique values $122_0 \ldots 122_{M-1}$ and the checksum value 124 outputs are each three-bytes wide.

In one example, the checksum value 124 (and the unique values $122_0 \ldots 122_{M-1}$ may be calculated as follows:

Step-1: Start with 0x00000 in the second register 116 (three bytes);

Step-2: EX-OR the content of the second register 116 with the incoming byte, keep the result in the second register 116; consider only three least significant bytes;

The EX-OR operation and bit-shift (left) operation can be implemented in the translator apparatus 106. A Read/Write memory cell may not be required in the translator apparatus 106 to save the received bytes.

In this example, there are M numbers of comparators $118_0 \ldots 118_{M-1}$, each being three-bytes wide, where M is the number of byte-sequences. The predetermined unique value 122 stored for each sequence is three-byte wide. Therefore, the total number of bytes to be stored is 3*M.

Consistent with one aspect of the present disclosure, in another implementation four bytes of the byte sequence are used to compute the checksum value 124. In one example, the byte sequence bytes from the eighth byte to the eleventh byte of the byte sequence are used to compute the checksum value 124.

In one example, the checksum value 124 (and the predetermined unique values $122_0 \ldots 122_{M-1}$ may be calculated as follows:

Step-1: Start with 0x00 in the second register 116 when the incoming byte is byte number eight and stop with byte number eleven.

Step-2: EX-OR the content of the second register 116 with the incoming byte, keep the result in the second register 116, consider only the least significant byte;

Step-3: Left shift the content of the second register 116 by one bit;

Step-4: Go to step 2 if there are more bytes coming and stop with byte number eleven.

Step-5: The resulting checksum value 124 output is the byte in the second register 116.

The computed checksum value 124 output by the algorithm (f) can be applied to the four bytes of the byte sequences (x) as shown in Table 2. The checksum values 124 are distinct, single-byte outputs for all the byte sequences.

TABLE 2

| Byte-sequence (x) | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Unique checksum output of f (in Hexadecimal notation) | 24 | C0 | 6C | 74 | CE | 14 | BE | FE | 9E | 9A | 8E | 2A | F8 | E6 | 9C | DA |

Step-3: Left shift the content of the second register 116 by one bit;

Step-4: Go to step-2 if there is another incoming byte;

Step-5: The checksum value 124 output is the three bytes in the second register 116.

The computed checksum value 124 outputs of the algorithm (f) applied to the byte sequence (x) are shown in Table 1. The checksum value 124 outputs are distinct, three-byte outputs for each of the byte sequences.

The EX-OR operation and bit-shift (left) operations used in an embodiment of the algorithm (f) are easily implemented in the second register 116. A Read/Write memory cell may not be required to save the received bytes in the translator apparatus 106.

The comparisons of the computed checksum value 124 stored in the second register 116 with the predetermined unique values $122_0 \ldots 122_{M-1}$ are done using single-byte comparators $118_0 \ldots 118_{M-1}$, each being one-byte wide; therefore, M number of single-byte comparators 118 are used, where M is the number of byte sequences.

TABLE 1

| Byte-sequence (x) | 0 | 1 | 2 | 3 | 4 | 5 | 6 | 7 |
|---|---|---|---|---|---|---|---|---|
| Unique checksum output of f (in Hexadecimal notation) | A4440 | EC0008 | B8C48 | 34440 | 8E440 | 54440 | FE440 | 3BE440 |

| Byte-sequence (x) (continued) | 8 | 9 | 10 | 11 | 12 | 13 | 14 | 15 |
|---|---|---|---|---|---|---|---|---|
| Unique checksum output of f (in Hexadecimal notation) | 1DE440 | 3DA440 | CE440 | 46A440 | B8440 | A6440 | 3DC440 | 9A440 |

The pre-determined unique values $122_0 \ldots 122_{M-1}$ for each byte sequence may be only one byte, therefore, the total number of bytes to be stored in the first register 112 is M bytes.

Consistent with one aspect of the present disclosure, in one implementation the byte sequences may have one or more portions that are distinct. For example, Table 3 shows the ninth byte for the byte sequences.

TABLE 3

| Byte-sequence (x) | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| The $9^{th}$ byte ($a_{x9}$) | 04 | 00 | 01 | 27 | <u>32</u> | 2B | 39 | 4C | 14 | <u>43</u> | 3F | 84 | <u>32</u> | 36 | <u>43</u> | 28 |

Twelve of the byte sequences have a unique value of the ninth byte. However, the fourth and the twelfth byte sequences have the same value (0x32) for the ninth byte. Additionally, the ninth and the fourteenth byte sequences have the same value (0x43) for the ninth byte. Therefore, a unique value may not be possible based only on the ninth byte of the byte sequences.

However, it is possible to generate unique values $122_0 \ldots 122_{M-1}$ for all the byte-sequences by using two bytes in the byte sequences, for example, the ninth byte and the eleventh byte of the byte sequences, as inputs to a suitable algorithm. Using fewer bytes than the whole byte sequence makes the computations of the calculations more efficient.

In one example, the checksum value 124 (and the unique values $122_0 \ldots 122_{M-1}$) may be calculated as follows:

Step-1: Copy the ninth byte to the second register;

Step-2: As the eleventh byte is received, EX-OR the least significant bit (LSB) of the eleventh byte with the least significant bit of the second register 116 to generate the new LSB of the second register 116. The seven bit positions [7:1] of the second register 116 remain unchanged.

Step-3: The second register 116 content is the resulting checksum value output.

Exemplary computed checksum values of the algorithm (f) are shown in Table 4 together with the ninth and the eleventh bytes of the byte sequences (x) that are used as inputs. The outputs are unique, single-byte values for all the byte sequences generated from the two bytes of the byte sequences.

TABLE 4

| Byte-sequence (x) | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| The $9^{th}$ byte ($a_{x9}$) | 04 | 00 | 01 | 27 | 32 | 2B | 39 | 4C | 14 | 43 | 3F | 84 | 32 | 36 | 43 | 28 |
| The $11^{th}$ byte ($a_{x11}$) | 00 | 00 | 32 | 26 | 2F | 2C | 3B | 4F | 15 | 41 | 3B | 85 | 34 | 2B | 42 | 45 |
| Unique checksum output of f (in Hexadecimal notation) | 04 | 00 | 01 | 27 | 33 | 2B | 38 | 4D | 15 | 42 | 3E | 85 | 32 | 37 | 43 | 29 |

The second register 116 utilizes a simple EX-OR operation in the application of the algorithm to the bytes of the byte sequence. A Read/Write memory cell to save the received bytes may not be required in the translator apparatus 106.

In this example, the comparisons of the computed checksum values 124 with the predetermined unique values $122_0 \ldots 122_{M-1}$ are done using single-byte comparators $118_0 \ldots 118_{M-1}$, being one-byte wide; therefore, M number of single-byte comparators $118_0 \ldots 118_{M-1}$ are used, where M is the number of byte sequences.

Since the predetermined unique value 124 stored for each sequence is only one byte, the total number of bytes to be stored in the first register 112 is M bytes.

The three different implementations described previously are summarized in the Table 5.

TABLE 5

| Bytes used in the checksum computation | Digital operations applied in the hash computation | Checksum output |
|---|---|---|
| All the bytes of the sequence are used | 1. EX-OR<br>2. Bit-Shift | Three-byte output |

TABLE 5-continued

| Bytes used in the checksum computation | Digital operations applied in the hash computation | Checksum output |
|---|---|---|
| Four data-bytes ($8^{th}$ to $11^{th}$ bytes) of the sequence are used | 1. EX-OR<br>2. Bit-Shift | Single-byte output |
| Two bytes ($9^{th}$ and the $11^{th}$ byte) are used | 1. EX-OR | Single-byte output |

It will be understood that the preceding implementations are merely explanatory and that a variety of implementations may be used.

CONCLUSION

Conventionally, changes to a component in a control module of a node without changing the system software required a hardware translator that was resource intensive in order for operating mode commands to be processed. In accordance with the present disclosure, methods and systems are described in which a translator in a control module is utilized to translate operating mode commands in a software-transparent and efficient manner.

The foregoing description provides illustration and description, but is not intended to be exhaustive or to limit the inventive concepts to the precise form disclosed. Modifications and variations are possible in light of the above teachings or may be acquired from practice of the methodologies set forth in the present disclosure.

Further, while implementations have been described in the context of an optical network, this need not be the case. These implementations may apply to an electronic network using copper cabling, or even a wireless network.

Even though particular combinations of features are recited in the claims and/or disclosed in the specification, these combinations are not intended to limit the disclosure. In fact, many of these features may be combined in ways not specifically recited in the claims and/or disclosed in the specification. Although each dependent claim listed below may directly depend on only one other claim, the disclosure includes each dependent claim in combination with every other claim in the claim set.

No element, act, or instruction used in the present application should be construed as critical or essential to the invention unless explicitly described as such outside of the preferred embodiment. Further, the phrase "based on" is intended to mean "based, at least in part, on" unless explicitly stated otherwise.

REFERENCES

The following references are hereby incorporated herein by reference:

RFC 3473 "Generalized Multi-Protocol Label Switching (GMPLS) Signaling Resource ReserVation Protocol-Traffic Engineering (RSVP-TE) Extensions," Berger (Ed.), The Internet Society, January 2003.

RFC 3945, Mannie, E., "Generalized Multi-Protocol Label Switching (GMPLS) Architecture", October 2004.

G.709-v3 ITU-T, "Interfaces for the Optical Transport Network (OTN)", G.709 Recommendation, December 2009.

G.872 ITU-T, "Architecture of optical transport networks", November 2001.

What is claimed is:

1. A control module for an optical switch node, the control module comprising:
   a tributary interface module having a plurality of operating modes in which a first mode of the plurality of operating modes is identified by a first byte sequence;
   a communication interface unit transmitting at least one first signal containing a second byte sequence for placing the tributary interface module into the first mode, the second byte sequence indicative of at least one operating mode command, the first byte sequence different from the second byte sequence; and
   a translator apparatus comprising:
      an input port receiving the second byte sequence from the communication interface unit;
      a first register storing a list of predetermined unique values, each value indicative of a particular operating mode command;
      a second register receiving at least a predetermined portion of the second byte sequence and receiving instructions to apply an algorithm to at least a portion of the second byte sequence to transform the portion of the second byte sequence into one or more checksum value;
      at least one comparator comparing the one or more checksum value to the list of predetermined unique values to determine the operating mode command contained in the byte sequence; and
      an output port transmitting at least one second signal containing the first byte sequence to the tributary interface module to place the tributary interface module into the first mode.

2. The control module of claim 1, wherein the first byte sequence has a first number of bits and the second byte sequence has a second number of bits that is different from the first number of bits of the second byte sequence.

3. The control module of claim 1, wherein the comparator is a three-byte comparator.

4. The control module of claim 1, wherein the comparator is a single-byte comparator.

5. The control module of claim 1, wherein the predetermined portion of the second byte sequence is two bytes of the second byte sequence.

6. The control module of claim 5, wherein the checksum value is a single byte.

7. The control module of claim 1, wherein the translator apparatus includes a field programmable gate array.

8. A method comprising:
   receiving, through an input port of a translator apparatus at least one first signal, the translator apparatus storing a list of predetermined unique values with each predetermined unique value being indicative of a particular operating mode command for a tributary interface module having a plurality of operating modes in which a first mode of the plurality of operating modes is identified by a first byte sequence, the first signal containing a second byte sequence indicative of at least one operating mode command for placing the tributary interface module in the first mode, the second byte sequence different from the first byte sequence;
   applying an algorithm to at least a portion of the second byte sequence to transform the portion of the second byte sequence into a checksum value;
   comparing, with at least one comparator in the translator apparatus, the checksum value to the list of predetermined unique values to determine the operating mode command contained in the second byte sequence; and
   transmitting, with an output port of the translator apparatus to the tributary interface module, at least one second signal containing the first byte sequence to place the tributary module into the first mode.

9. The method of claim 8, wherein the first byte sequence is of different length from the second byte sequence.

10. The method of claim 8, wherein the comparator is a three-byte comparator.

11. The method of claim 8, wherein the comparator is a single-byte comparator.

12. The method of claim 8, wherein the portion of the second byte sequence is two bytes of the second byte sequence.

13. The method of claim 8, wherein the checksum value is a single byte.

14. The method of claim 8, wherein the translator apparatus includes a field programmable gate array.

15. A method comprising the steps of:
   identifying, in a tributary interface module in a control module, a first mode in a plurality of operating modes in which the first mode is identified by a first byte sequence;
   transmitting, with a communication interface unit in the control module, at least one first signal containing a second byte sequence for placing the tributary interface module in the first mode, the second byte sequence containing at least one operating mode command, the second byte sequence different from the first byte sequence;
   storing, with a first register of a translator apparatus in the control module, a list of predetermined unique values, each value indicative of a particular operating mode command for the tributary interface module;
   receiving, through an input port of the translator apparatus from the communication interface unit, the at least one first signal;
   receiving, with a second register of the translator apparatus, at least a predetermined portion of the second byte sequence and applying an algorithm to the portion of the second byte sequence to transform the portion of the second byte sequence into one or more checksum values;

comparing, with at least one comparator in the translator apparatus, the one or more checksum value to the list of predetermined unique values to determine the operating mode command contained in the byte sequence; and transmitting, with an output port of the translator apparatus to the tributary interface module, at least one second signal containing the first byte sequence to place the tributary module into the first mode.

16. The method of claim 15, wherein the first byte sequence is of different length from the second byte sequence.

17. The method of claim 15, wherein the comparator is a single-byte comparator.

18. The method of claim 15, wherein the predetermined portion of the second byte sequence is two bytes of the second byte sequence.

19. The method of claim 18, wherein the one or more checksum value is a single byte.

20. The method of claim 15, wherein the translator apparatus includes a field programmable gate array.

* * * * *